Aug. 18, 1959   R. E. PRICE   2,899,779
ROTARY WORK CARRIERS FOR DISC GRINDERS
Filed July 25, 1957   7 Sheets-Sheet 2
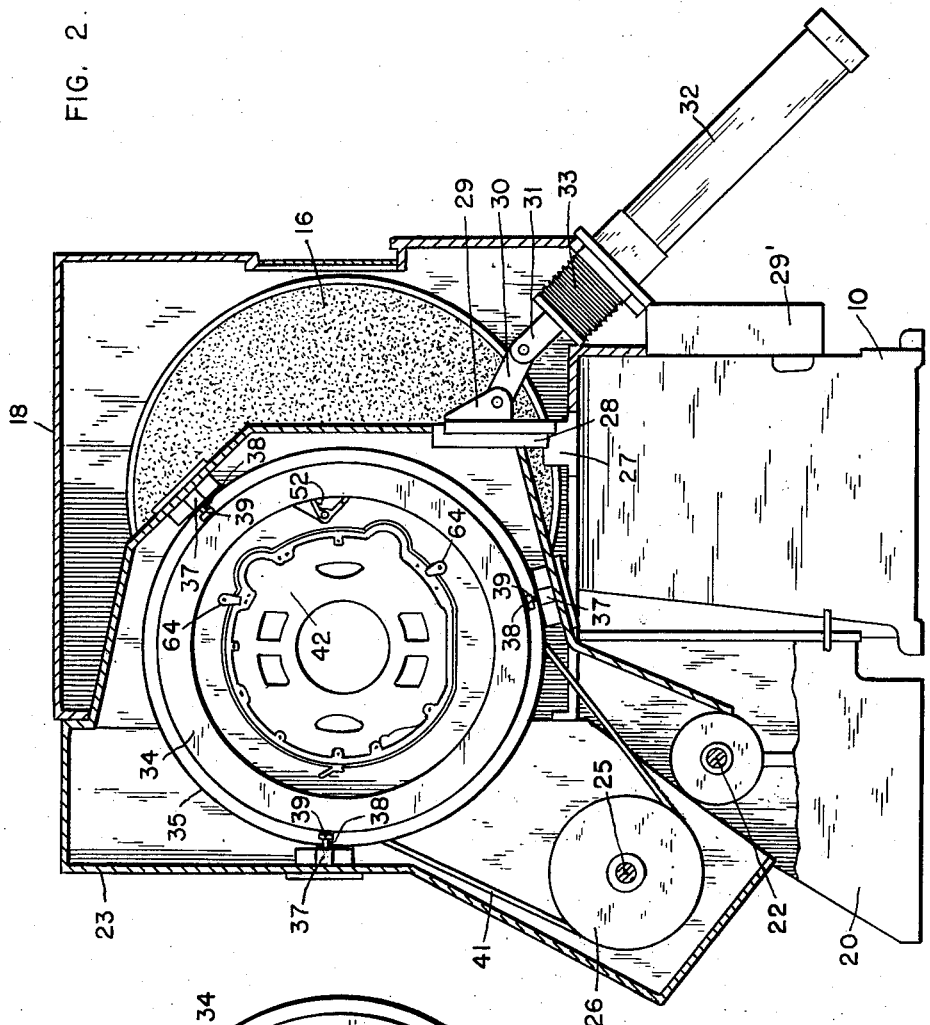
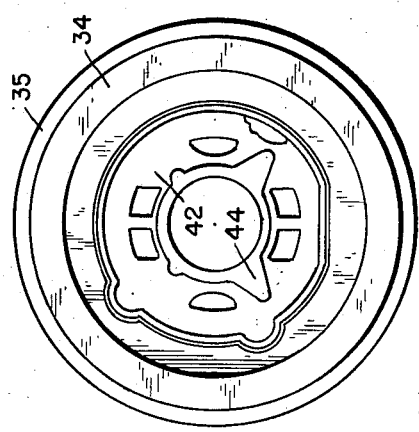
R.E. Price
INVENTOR
BY Mason, Porter, Diller & Stewart
ATTORNEYS

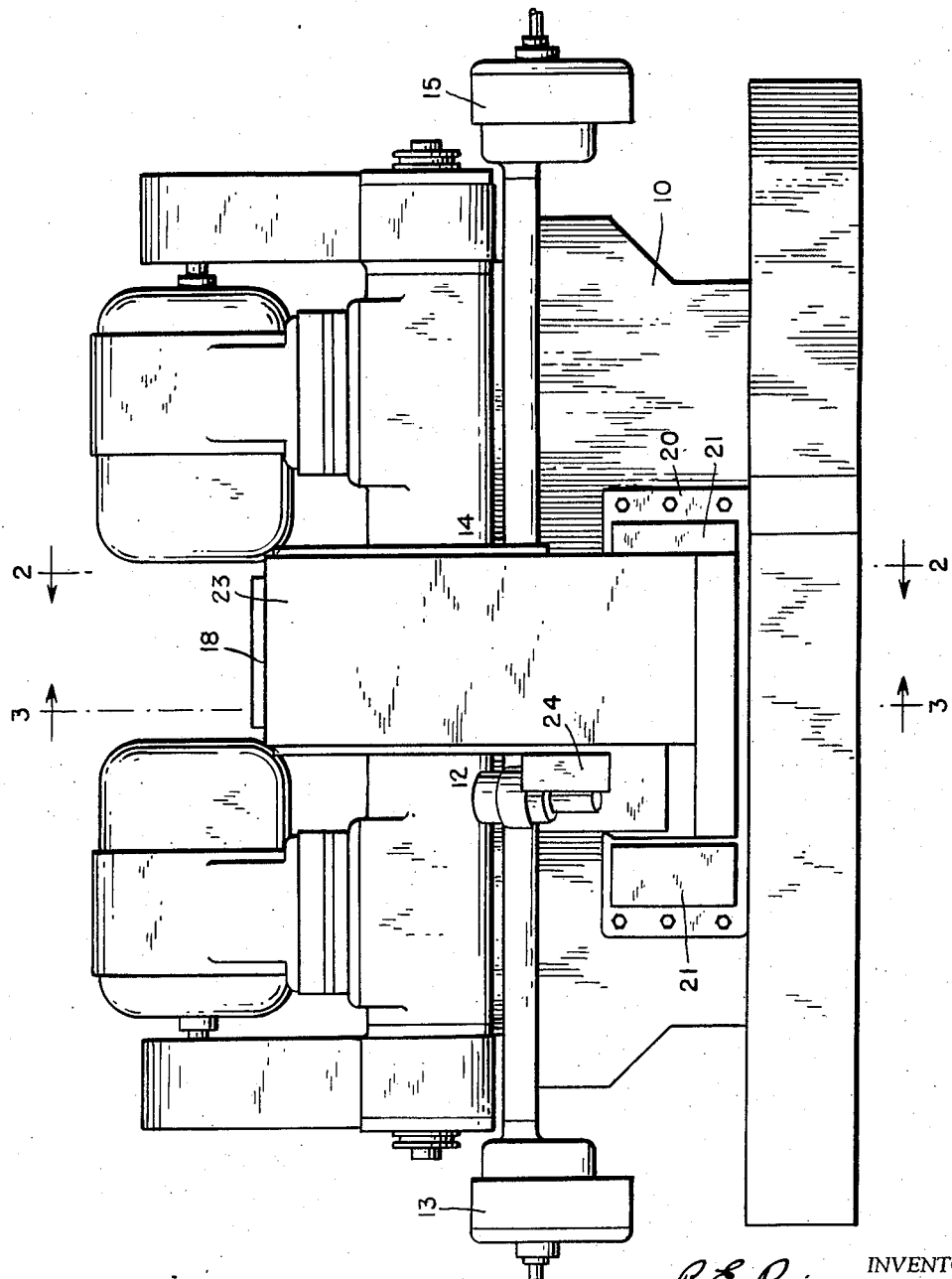

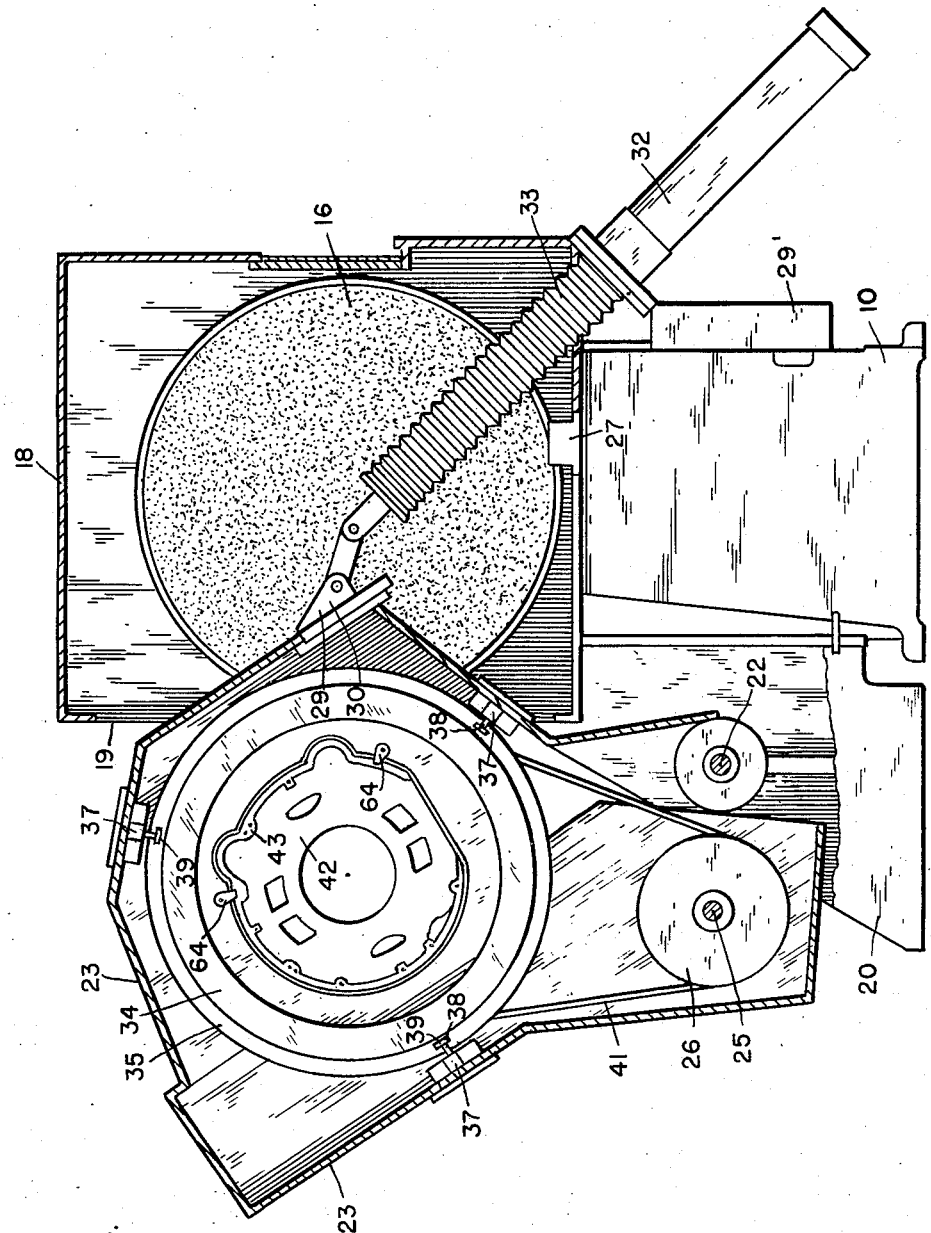

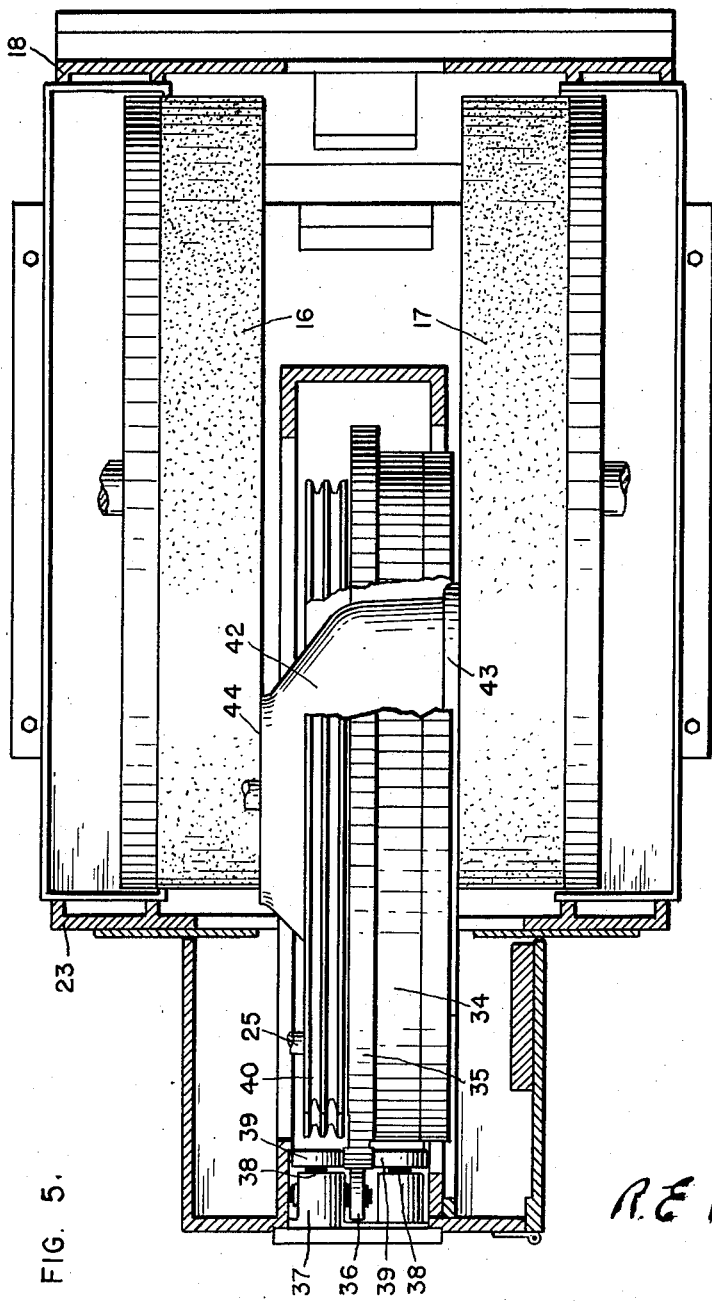

Aug. 18, 1959  R. E. PRICE  2,899,779
ROTARY WORK CARRIERS FOR DISC GRINDERS
Filed July 25, 1957  7 Sheets-Sheet 6

R. E. Price
INVENTOR

BY Mason, Porter, Miller & Stewart
ATTORNEYS under United States Patent Office 2,899,779
Patented Aug. 18, 1959

2,899,779

ROTARY WORK CARRIERS FOR DISC GRINDERS

Ralph E. Price, Waynesboro, Pa., assignor to Gardner Machine Company, Beloit, Wis.

Application July 25, 1957, Serial No. 674,141

11 Claims. (Cl. 51—118)

The following specification relates to improvements in an insertable rotary work carrier for a disc grinder.

More particularly the invention is intended to mount an irregular work-piece upon a carrier for insertion between parallel opposed grinding disks. The work-piece has opposite faces which are to be ground into parallel planes definitely spaced apart.

One of the objects of the invention is to provide a rotary carrier for irregularly shaped work-pieces.

A further object of the invention is to provide for oscillating this carrier and its supporting frame into and out of operating position between the opposite grinding disks.

A still further object of the invention is to positively support the carrier in its frame during operation.

Among the objects of my invention is to provide rocking means for placing the carrier and its frame between the grinding disks.

Incidental to the objects of the invention is the provision of means for positively supporting the frame of the carrier in operating position between the disks.

A still further object of the invention is to provide means on the carrier for holding the work-piece in desired position between the grinders so that the surfaces to be ground are perpendicular to the grinding disks.

These and other objects of the invention will be readily apparent from the following description of the preferred form of the invention as shown by way of example on the accompanying drawings in which:

Figure 1 is a side elevation of the rotary work carrier mounted between two opposed grinding disks;

Figure 2 is a vertical transverse section taken on the line 2—2 of Fig. 1 showing the rotary work carrier in operating position;

Figure 3 is a similar fragmentary section taken on the line 3—3 of Fig. 1;

Figure 4 is a vertical transverse section taken on the line 2—2 of Fig. 1 with the rotary work carrier retracted to loading position;

Figure 5 is a plan view of the carrier in operating position, parts being shown in section;

Figure 6:
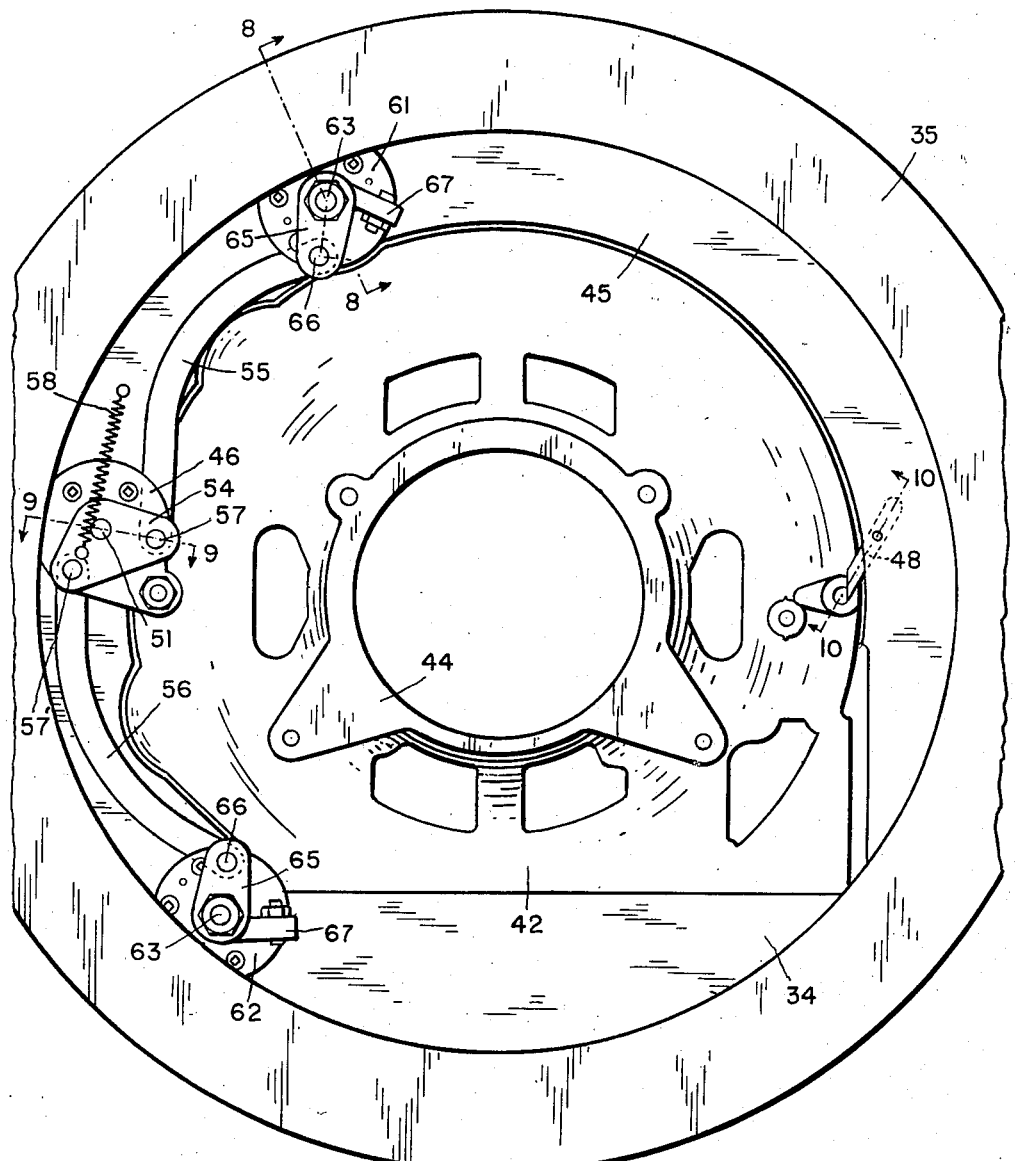
Figure 6 is an enlarged side elevation showing the carrier with the work-holding means.

Broadly described the invention consists in providing a frame which can be oscillated or rocked from an inoperative loading position to an operating position between two opposed rotary grinding disks. When in operating position the grinding disks are advanced toward each other so that the grinding of opposite sides of the work-piece held in the frame is carried out until the desired distance between the opposite ground faces of the work-piece is established.

The carrier is a rotatable element journalled for rotation within its frame. It is also rotated at the desired speed by motive power mounted upon the frame and oscillated therewith. The frame with the carrier and work-piece is moved into the face between the disks by a suitable reciprocating motor which also serves to oscillate the frame into inoperative position after conclusion of the grinding operation.

The preferred form of the improved structure is shown on the drawings. A base 10 is provided on which the the work carrier and the opposed grinding disks are mounted for relative movement.

Thus a motor driven disk grinder is carried by housing 12 upon base 10 in ways which permit independent advance and withdrawal by means of the feed mechanism 13.

The opposed motor driven disk grinder is carried by a second housing 14 on the base 10 and advanced toward and from the grinder housing 12 by means of the feed mechanism 15. Suitable means not illustrated are provided to limit the inward movement of the housings 12 and 14.

The spindle of the housing 12 has a grinding disk 16, while a grinding disk 17 is mounted on the opposite spindle in the housing 14 (Figure 5).

A casing 18 surrounds the disks 16 and 17. It is provided with an open front 19 for receiving the work carrier and its support. The front of the base 10 has an extension 20 (Figure 4).

Journal bearings 21, 21 are mounted on the extension 20 and support the rock shaft 22. The rock shaft 22 forms a support for a frame 23. This frame is in the form of a housing for the carrier and its operating mechanism.

One side of the frame is extended laterally as shown in Figure 1 to support a motor and gear reduction unit 24. This unit is connected to a drive shaft 25 running transversely through the frame and suitably journalled.

A drive pulley 26 is carried on the shaft 25 and has a plurality of peripheral grooves for drive belts.

Above the axis of the grinding disks the base 10 is provided with a stop 27. This stop is in the form of an inverted V.

A complementary foot 28 is formed on the frame opposite to the stop 27. The foot has a V-shaped bottom which rests on the stop 27.

A bracket 29 on the rear wall of the frame is connected by means of a link 30 to the piston rod 31 of a hydraulic cylinder 32 mounted on the base 10. The piston rod 31 is surrounded by a leak-proof bellows 33.

By this means the frame 23 can be mechanically oscillated or rocked from the inoperative position shown in Figure 4 to the operating position shown in Figure 2.

The carrier 34 is ring-shaped and has a peripheral rim 35. The rim 35 rests against three equally spaced bearing rollers 36 mounted on the inner wall of the frame 23. The rollers 36 are held in journals for easy rotation.

Journals 37 provide stub shafts 38 on which are mounted opposed aligning or truing rollers 39 between which the rim 35 is held. The rim 35 is therefore held against lateral movement in each of the three equidistant positions within the frame.

The carrier 34 has an attached sheave 40 on one side. This has a plurality of grooves in which a plurality of belts 41 are received. The belts run from the opposite grooves in the drive pulley 26 on shaft 25.

The work-piece has ben illustrated as an irregular casting specifically intended as an automotive torque convertor housing. This work-piece 42 is somewhat like a bowl having opposite side faces 43 and 44 which are to be ground parallel. The face 43 is larger than the opposite face 44.

The work-piece 42 rests upon a rest plate 45 forming part of the carrier 34. The rest plate has attached thereto a locator plate 46. This locator plate supports a locator pin 47. The pin 47 fits within the apertured rim 48 of the work-piece 42.

Figure 9:
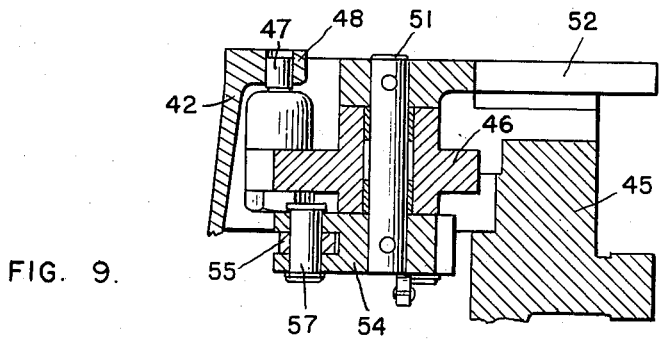
Figure 9 is a fragmentary transverse section taken on the line 9—9 of Fig. 6.
Figure 10:
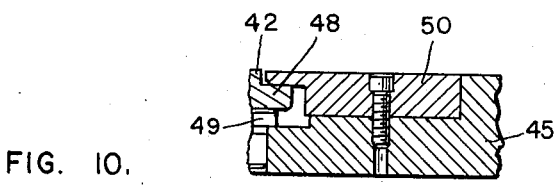
Figure 10 is a fragmentary transverse section taken on the line 10—10 of Fig. 6.

A rest button 49 on the rest plate 45 also supports the rim 48 of the work-piece 42. A lock 50 in the form of a bar with a tongue is attached to the rest plate 45, as shown in Fig. 9. The tongue of the lock bar 50 overlies the flange 48 when the latter is slid into position over the rest button 49.

The locator plate 46 has a bearing in which a rock shaft 51 may rotate. The rock shaft at one end has an attached trip lever 52 by which the shaft is oscillated. The trip 52 fits in a recess 53 of the carrier. The trip lever 52 is mechanically operated in either direction by a detent not shown which functions at the end of a working cycle in order that the holding means for the work-piece may be engaged or disengaged as needed.

The opposite end of shaft 51 carries a toggle plate 54. The toggle plate is forked on two opposite corners to receive toggle links 55, 56. The toggle links are held in position by means of pins 57, 57.

A spring 58 connects the toggle plate 54 to the rest plate 45. The position of the spring is such that it holds the toggle plate in position at the end of each movement caused by the oscillation of the trip lever 52.

Figure 7:
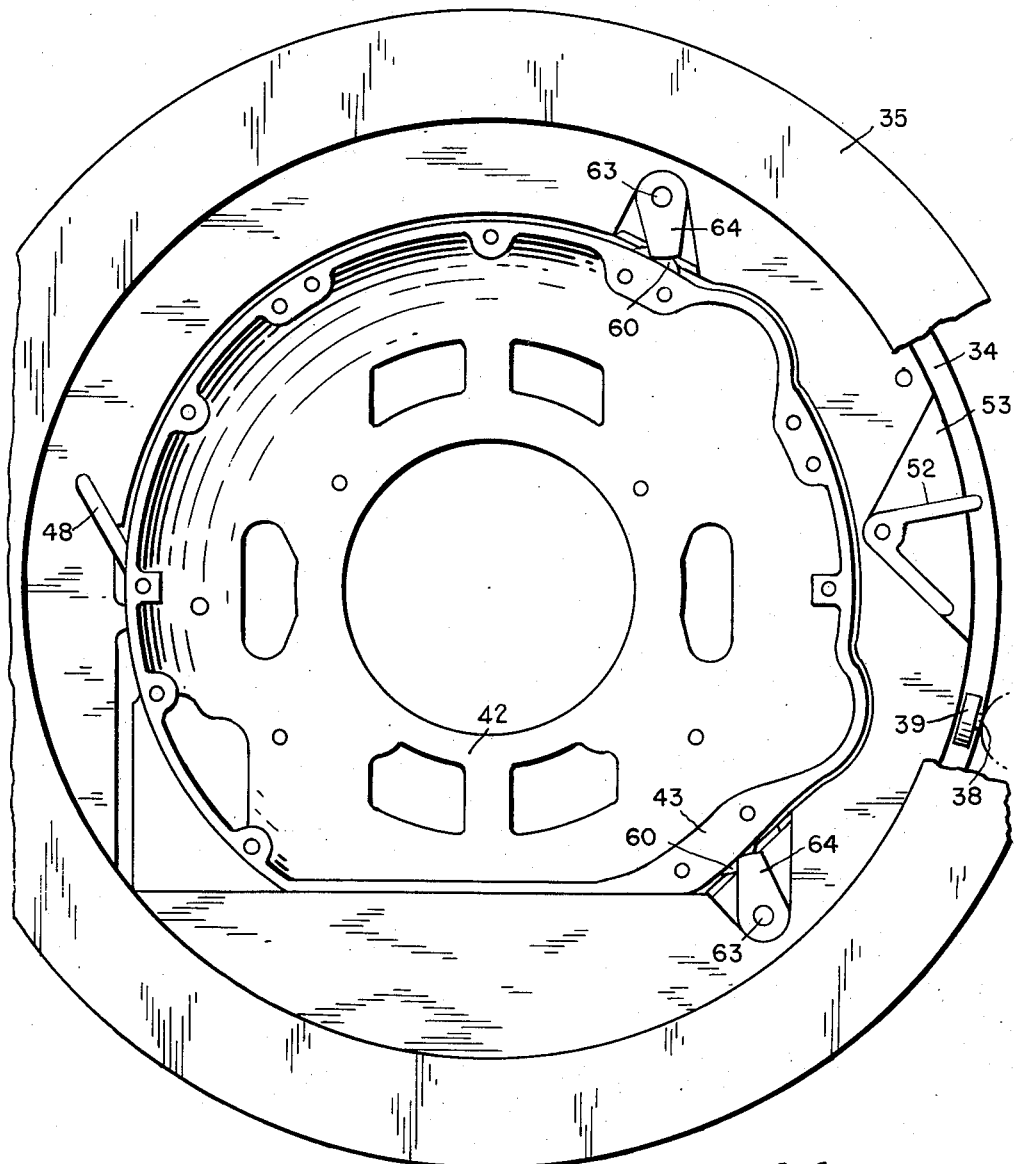
Figure 7 is a similar side elevation showing the opposite side of the carrier and work-holding means.

The locator plate 46 is diametrically spaced from the lock bar 50. Intermediately spaced from locator plate 46, the rest plate 45 is provided with rest buttons 49 (Figure 7). Lugs 60 carried on the flange of the work-piece 42 are spaced in position to rest upon the buttons 49.

Brackets 61, 62 are fitted into the rest plate beneath the buttons 49. The brackets 61, 62 and associated parts are identical. Each includes a rock shaft 63 journaled in each bracket 61, 62. At one end of the shaft 63 is an attached latch 64 which, as shown in Figure 7, can be brought into position over the lock 60 and thus hold the work-piece 42 against the button 49. A crank 65 is keyed to the opposite end of the shaft 63. One arm of each crank 65 is forked as shown in Figure 7 and carries a pin 66. The pin 66 is a pivot for the link 55. The crank 65 also has an adjustable stop 67.

Figure 8:
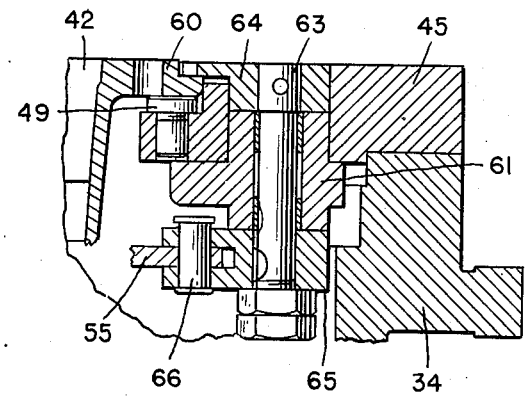
Figure 8 is a fragmentary transverse section taken on the line 8—8 of Fig. 6.

Assuming the housing 23 to be withdrawn into the loading position shown in Figure 4, a work-piece 42 is inserted through one of the open sides of the housing 23. This will of course be the right-hand side, as shown in Figure 5. The rim 48 of the work-piece is fitted between the rest button 49 and the lock bar 50, as shown in Figure 9. At the same time the apertured rim is fitted over the locking pin 57, as shown in Figure 8.

By moving of the trip lever 52, the links 55, 56 are moved from inactive to holding position. The latches 64 will then rest upon the lugs 60 of the work-piece and hold the latter in fixed position on the rest buttons 49. As a result the work-piece is thus held at four spaced points on its periphery.

The fluid motor 32 is then operated to rock the housing 23 into the space between the opposed grinding disks 16 and 17. At the end of this movement the foot 28 of the housing 23 is seated within the step 27.

The grinding disks are then brought into engagement with the faces 43 and 44 of the work-piece which it is intended to be ground. The carrier 34 together with the rest plate 45 and the work-piece 42 is then rotated by means of the drive pulley 26 and associated drive belts. The work-piece is thus given rotation while being ground by the disks 16 and 17. During this rotation the carrier 34 has its rim rotating on the roller bearings 36. At the same time, the truing rollers 39 maintain the carrier in a fixed plane.

At the conclusion of the grinding operation and when the faces 43 and 44 have been ground into parallelism at the desired distance apart, the grinding operation is stopped and the grinding disks 16 and 17 retracted. The housing 23 is then rocked into inoperative position, as shown in Figure 4 by the fluid motor 32. Tripping the latch 52 retracts the latches 64, 64 and permits the work-piece to be lifted from the locator pin 47 and out of the position between rest button 49 and the lock bar 50.

The work holding means described above is for a particular workpiece. Details of this holding means will vary to correspond to the shape and dimensions of the workpiece.

While the above describes the preferred form of the invention, it is understood that changes may be made in minor details, proportions and materials without departing from the scope of the following claims.

What I claim is:

1. A grinder for the opposite faces of a work-piece comprising a base, a pair of grinding discs having spaced parallel faces mounted on said base for simultaneous rotation, a housing pivotally journaled on said base for rocking movement into operating position between said discs, a work-carrier rotatably mounted in said housing, means for rotating the carrier parallel to the disc faces and midway between them, and means for holding a work-piece in said carrier.

2. A grinder for the opposite faces of a work-piece comprising a base, a pair of grinding discs having spaced parallel faces mounted on said base for simultaneous rotation, a longitudinally journaled power shaft on the base, a housing pivotally journaled on said base, a foot on the housing, a complementary step on the base for supporting the foot with the housing interposed opposite the discs, a work-carrier rotatably mounted in said housing, means for rotating the carrier parallel to the disc faces and midway between them, and means for holding a work-piece in said carrier.

3. A grinder for the opposite faces of a work-piece comprising a base, a pair of grinding discs having spaced parallel faces mounted on said base for simultaneous rotation, a longitudinally journaled power shaft on the base, a housing pivotally journaled on said base, a fluid motor for oscillating the housing into and out of operative position between the discs, a foot on the housing, a complementary step on the base for supporting the foot with the housing interposed opposite the discs, a work-carrier rotatably mounted in said housing, means for rotating the carrier parallel to the disc faces and midway between them, and means for holding a work-piece in said carrier.

4. A grinder for the opposite faces of a work-piece comprising a base, a pair of grinding discs having spaced parallel faces mounted on said base for simultaneous rotation, a longitudinally journaled power shaft on the base, a housing pivotally journaled on said base for rocking movement into operating position between said discs, a work-carrier rotatably mounted in said housing, means for rotating the carrier from said shaft parallel to the disc faces and midway between them, and means for holding a work-piece in said carrier.

5. A grinder for the opposite faces of a work-piece comprising a base, a pair of spaced parallel grinding discs mounted on said base for simultaneous rotation, a housing pivotally journaled on said base for rocking movement into operating position between said discs, a work-carrier rotatably mounted in said housing, means for rotating the carrier, means for locating the work-piece in the carrier, work-locking means diametrically related thereto, and latch means located intermediate the said locating and locking means.

6. A grinder for the opposite faces of a work-piece comprising a base, a pair of spaced parallel grinding discs mounted on said base for simultaneous rotation, a housing pivotally journaled on said base for rocking movement into operating position between said discs, a work-carrier rotatably mounted in said housing, means for rotating the carrier, means for locating the work-piece in the carrier, work-locking means diametrically related thereto, and a pair of latches each located intermediate the said locating and locking means.

7. A grinder for the opposite faces of a work-piece comprising a base, a pair of spaced parallel grinding discs mounted on said base for simultaneous rotation, a housing pivotally journaled on said base for rocking movement into operating position between said discs, a work-carrier rotatably mounted in said housing, means for rotating the carrier, means for locating the work-piece in the carrier, work-locking means diametrically related thereto, a pair of spaced latches located intermediate the said locating and locking means and a common operating means for simultaneously actuating said latches.

8. A grinder for the opposite faces of a work-piece comprising a base, a pair of spaced parallel grinding discs mounted on said base for simultaneous rotation, a housing pivotally journaled on said base for rocking movement into operating position between said discs, a work-carrier rotatably mounted in said housing, means for rotating the carrier, means for locating the work-piece in the carrier, work-locking means diametrically related thereto, a pair of spaced latches located intermediate the said locating and locking means, a pivoted toggle plate and a link connecting the plate with each of said latches.

9. A grinder for the opposite faces of a work-piece comprising a base, a pair of grinding discs having spaced parallel faces mounted on said base for simultaneous rotation, a housing pivotally journaled on said base for rocking movement into operating position between said discs, an annular work-carrier having a rim rotatably mounted in said housing with the carrier in the plane parallel to the faces of the discs and midway between them, a motor journaled in said housing and operatively connected to the carrier, and means for holding a work-piece within said carrier.

10. A grinder for the opposite faces of a work-piece comprising a base, a pair of grinding discs having spaced parallel faces mounted on said base for simultaneous rotation, a housing pivotally journaled on said base for rocking movement into operating position between said discs, an annular work-carrier having a rim rotatably mounted in said housing with the carrier in the plane parallel to the faces of the discs and midway between them, thrust bearings on the housing in engagement with the side of said rim, a motor journaled in said housing, a belt drive from the motor to the carrier and means for holding a work-piece within said carrier.

11. Work-feeding means for a grinder having grinding discs in parallel spaced positions on a base, said feeding means comprising a housing, a work-carrier supported in said housing for rotation in a plane parallel to the faces of the discs and midway between them, a motor in said housing in driving connection with said carrier, means for moving the housing with the carrier into and out of operating position relative to said discs, a stop on the base and a registering foot on the housing when in operative position.

References Cited in the file of this patent
UNITED STATES PATENTS
2,141,191     Lundberg et al. _____ Dec. 27, 1938